(12) United States Patent
Okazaki

(10) Patent No.: US 8,819,710 B2
(45) Date of Patent: Aug. 26, 2014

(54) OPTICAL PICKUP DEVICE

(75) Inventor: Taishi Okazaki, Ora-gun (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 289 days.

(21) Appl. No.: 13/501,412

(22) PCT Filed: Jul. 28, 2011

(86) PCT No.: PCT/JP2011/004268
§ 371 (c)(1),
(2), (4) Date: Apr. 11, 2012

(87) PCT Pub. No.: WO2012/023243
PCT Pub. Date: Feb. 23, 2012

(65) Prior Publication Data
US 2012/0204199 A1 Aug. 9, 2012

(30) Foreign Application Priority Data
Aug. 18, 2010 (JP) ................. 2010-182924

(51) Int. Cl.
*G11B 33/14* (2006.01)
*G11B 7/085* (2006.01)
*G11B 7/22* (2006.01)
*G11B 7/12* (2012.01)
*G11B 7/08* (2006.01)

(52) U.S. Cl.
CPC .............. *G11B 7/08582* (2013.01); *G11B 7/22* (2013.01); *G11B 7/12* (2013.01)
USPC ........... 720/681; 720/649; 720/671; 720/672; 720/685

(58) Field of Classification Search
USPC .......................... 720/649, 671–672, 681, 685
See application file for complete search history.

(56) References Cited

U.S. PATENT DOCUMENTS

2007/0082419 A1 4/2007 Nabe et al.
2008/0250439 A1* 10/2008 Itoh et al. .................... 720/649

FOREIGN PATENT DOCUMENTS

| JP | 3-57723 | 6/1991 |
| JP | 9-231597 | 9/1997 |
| JP | 2005-216436 | 8/2005 |
| JP | 2006-12261 | 1/2006 |
| JP | 2007-102826 | 4/2007 |

OTHER PUBLICATIONS

International Search Report mailed Sep. 20, 2011, directed to International Application No. PCT/JP2011/004268; 4 pages.
Japanese Office Action dated Nov. 13, 2012, directed to Japanese Application No. 2012-529478; 2 pages.

* cited by examiner

*Primary Examiner* — Wayne Young
*Assistant Examiner* — Carlos E Garcia
(74) *Attorney, Agent, or Firm* — Morrison & Foerster LLP

(57) ABSTRACT

An optical pickup device is provided, a cover of which covering a housing is prevented from deforming. A principal surface of an optical pickup device of the present invention is covered with a cover 13. The cover 13 includes: a cover portion 13G; a hole portion 13 provided at an end in the longitudinal direction and is screwed; an engagement portion 13A provided at the other end in the longitudinal direction and is engaged with the housing; and an engagement portion 13D engaged with the opening portion of the housing in the middle part. The engagement portion 13D placed in the middle part of the cover portion 13G is engaged with the housing to prevent the cover portion 13G from bulging outward.

10 Claims, 10 Drawing Sheets

OPTICAL PICKUP DEVICE

This application is the national stage under 35 USC 371 of the International Application No. PCT/JP2011/004268, filed Jul. 28, 2011, which claims priority from Japanese Patent Application Number JP 2010-182924 filed on Aug. 18, 2010, the contents of which are incorporated herein by reference in its entirety.

FIELD OF THE INVENTION

The present invention relates to an optical pickup device. Specifically, the present invention relates to an optical pickup device with a principal surface of the housing covered with a covering member.

BACKGROUND OF THE INVENTION

An optical pickup device has functions of irradiating an optical disc with a laser beam of a predetermined wavelength emitted from a light emitting device and detecting the laser beam reflected on an information recording layer of the optical disc with a light receiving element (Patent Document 1). Accordingly, the optical pickup device can perform operations of reading and writing information from and to optical discs.

A general optical pickup device includes multiple optical elements accommodated in a housing. A flexible wiring board connected to the optical elements, control elements, and the like are arranged on the upper surface of the housing. The flexible wiring board and control elements are covered with a covering member formed by molding a metallic plate of stainless or the like into a predetermined shape.

Patent Document 1: Japanese Patent Laid-open Publication No. 2005-216436

SUMMARY OF THE INVENTION

The aforementioned covering member is fixed to the principal surface of the housing using engagement means provided at ends, such as screw mechanisms or hooks. However, when the covering member is fixed to the housing only at the both ends, a portion around the center of the covering member will deform to bulge outward in some cases. This is because the housing manufactured by injection-molding of a resin or metallic material is low in processing accuracy. Another one of the causes is a difference in thermal expansion coefficient between the covering member and the housing.

In such a case, the exterior size of the optical pickup device is varied, and large deformation of the covering member may result in a defect.

Furthermore, if the optical pickup device with the covering member bulged outward is placed in a very small space such as the interior of a notebook personal computer or the like, the covering member bulged outward may come into contact with another part when the optical pickup device moves in use.

The present invention was made in the light of such problems, and an object of the present invention is to provide an optical pickup device in which a covering member covering the housing is prevented from deforming.

An optical pickup device according to the present invention includes: a housing including a first principal surface on which an objective lens is placed and a second principal surface opposite to the first principal surface; an optical element accommodated in the housing; and a covering member covering an area of the first principal surface of the housing except the objective lens, in which the covering member is screwed near at least one of both ends in a longitudinal direction and has an engagement portion in a middle part in the longitudinal direction.

According to the present invention, the middle part of the covering member in the longitudinal direction is engaged with the housing with the engagement portion. This prevents the covering member from bulging outward even in the case where the housing does not have a high processing accuracy.

DETAILED DESCRIPTION OF THE INVENTION

Figure 1A:
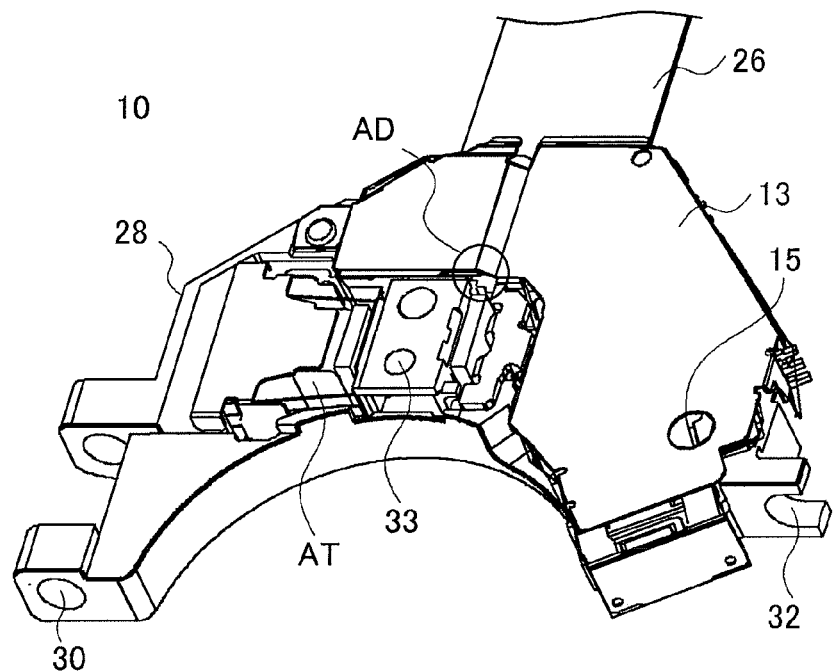
FIGS. 1A and 1B are views showing an optical pickup device of the present invention, FIG. 1A being a perspective view showing the optical pickup device with a cover attached, FIG. 1B being a perspective view showing the optical pickup device with the cover detached.
Figure 1B:
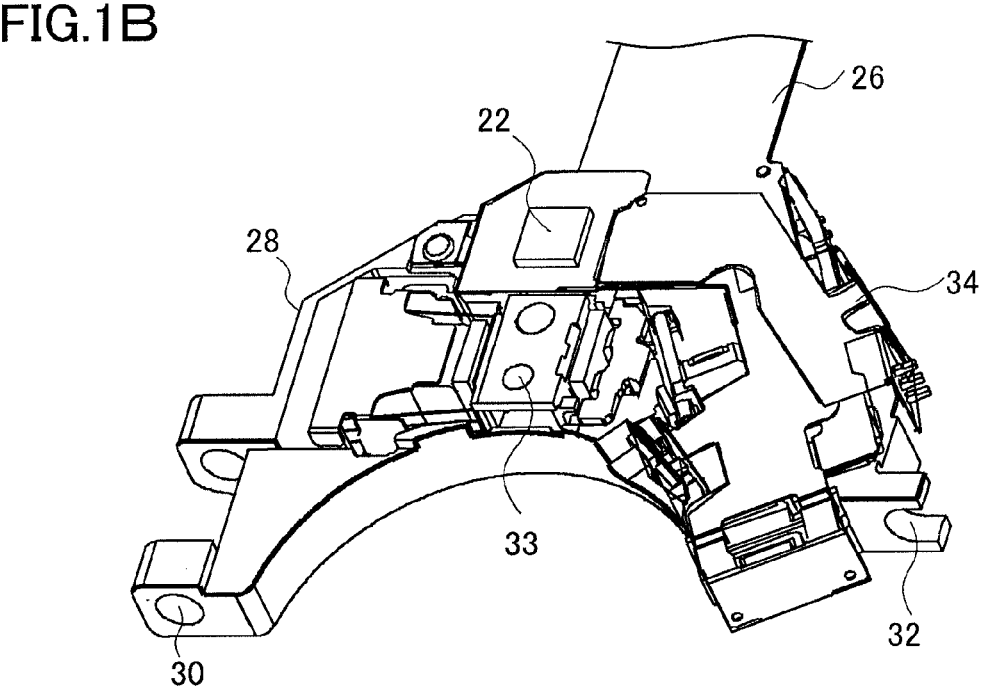
Figure 9A:
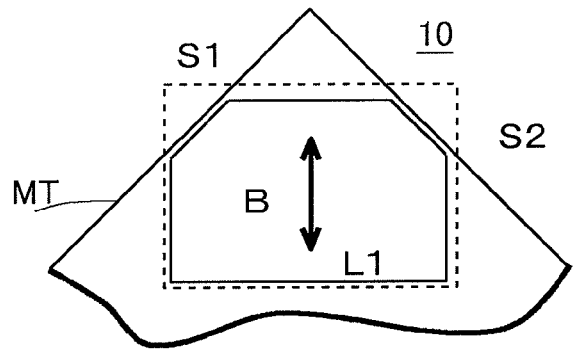
FIGS. 9A to 9C are views showing an exterior profile of the optical pickup device of the present invention.
Figure 9B:
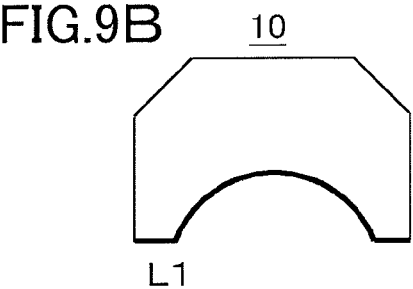
Figure 9C:
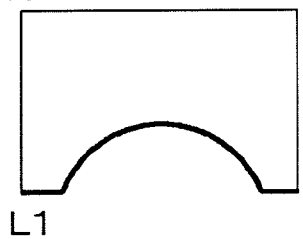

With reference to FIGS. 1A and 1B, a description is given of a configuration of an optical pickup device 10. FIG. 1A is a perspective view showing the optical pickup device of this embodiment, and FIG. 1B is a perspective view showing the optical pickup device 10 with a cover 13 (a covering member) removed. In the following description, the principal surface of the optical pickup device 10 where an objective lens 33 is exposed is referred to as an upper surface, and the other principal surface opposite to the upper surface is referred to as a lower surface. The shape of the housing 28, described later, is a box-shape provided with a thick bottom plate in the lower surface and a sidewall provided perpendicularly from the periphery of the bottom plate. In this bottom plate, the lens side is defined as a front side, and the opposite surface thereto is defined as a back side. Moreover, the accommodation side of the sidewall is the inner side and the opposite surface thereto is the outer side. Furthermore, the planer shape of the housing 28 may be varying, and examples thereof include a rectangle or a rectangle with two corners cut off if the curvature is ignored as shown in FIGS. 9B and 9C.

The optical pickup device 10 includes a function of focusing a BD (Blu-ray disc) format, DVD (digital versatile disc) format, or CD (compact disc) format laser light onto an information recording layer of an optical disc (an information recording medium), receiving the light reflected from the information recording layer, and converting the same into an electrical signal. The optical pickup device 10 includes a light emitting chip for BD and a light emitting chip for DVD and CD, for example.

Laser beams emitted from the optical pickup device 10 include BD format laser beams (the blue-violet wavelength band: 400 to 420 nm), DVD format laser beams (red wavelength band: 645 to 675 nm), and CD format laser beams (infrared wavelength band: 765 to 805 nm). Herein, the optical pickup device 10 unnecessarily corresponds to the laser beams of three kinds of formats and may correspond to laser light of one or two formats.

The optical pickup device 10 includes: the housing 28; various optical elements incorporated in the housing 28; a flexible wiring board 26 electrically connected to the optical elements; and a cover 13 covering the upper surface of the housing 28 on which the objective lens 33 is arranged. As shown in FIG. 1A, an actuator AT incorporating the objective lens is exposed from the cover 13.

The housing 28 is made of a resin material or a metal material (magnesium, for example) integrally formed by injection molding. Inside and on the side surface of the housing 28, various types of optical elements are arranged. At the both ends of the housing 28, a guide hole 30 and a guide recess 32 are provided. In the guide hole 30, a guide shaft is inserted in use. The guide recess 32 is engaged with another guide shaft. The optical pickup device 10 moves in the radial direction of the optical disc along these guide shafts.

Inside the housing 28, partition walls are extended from the bottom plate or sidewall to provide plural accommodation spaces in which the optical elements are attached. The housing 28 includes the accommodation space for the actuator exterior. On the upper surface of the housing 28, the actuator holding the objective lens 33 so that the objective lens 33 can move is placed. Moreover, on the upper surface of the housing 28, the flexible wiring board 26 is folded and fixed.

Inside the housing 28, the plural optical elements are incorporated. For example, the housing 28 is provided with a laser device emitting laser light, a PDIC receiving laser light, a diffraction grating, a prism, an anamorphic lens, a mirror, and the like.

The cover 13 is composed of a thin metallic plate formed into a predetermined shape by bending work. The metallic plate is made of a metallic material such as stainless. The cover 13 covers the upper surface of the housing 28. Specifically, most part of the upper surface of the housing 28 is covered with the cover 13 except the part where the actuator supporting the objective lens 33 is placed.

The internal space of the housing 28 incorporating the optical elements such as a prism is closed by the cover 13, thus preventing penetration of dust and the like into the internal space from the outside. Furthermore, the cover 13 also prevents intrusion of light from the outside into the internal space of the housing 28.

Since the cover 13 is shaped by pressing a metallic plate cut into a predetermined shape, the dimensional accuracy thereof is very high. Moreover, the cover 13 is provided with a hole portion for fixation with a screw mechanism and engagement portions and is fixed to the predetermined part of the upper surface of the housing 28 through these hole portion and engagement portions. This matter is described later with reference to FIGS. 2A and 2B. Furthermore, the cover 13 is partially opened to provide an opening portion 15. This opening portion 15 is used for position adjustment of the incorporated optical elements.

With reference to FIG. 1B, the flexible wiring board 26 connects the optical elements incorporated in the optical pickup device 10 to the outside. The flexible wiring board 26 is subjected to bending processing several times to be folded and is fixed to the upper surface of the housing 28. The concrete structure of the flexible wiring board 26 is described later with reference to FIGS. 5A and 5B.

On the other hand, the flexible wiring board 34 connects an LD for DVDs and CDs as one of first optical elements to a package 22 incorporating a control element controlling the LD. The flexible wiring board 34 includes wiring patterns formed on the both principal surfaces of the base material. The wiring patterns formed on both surfaces of the flexible wiring board 34 are thicker than the wiring patterns formed on the flexible wiring board 26.

Figure 2A:
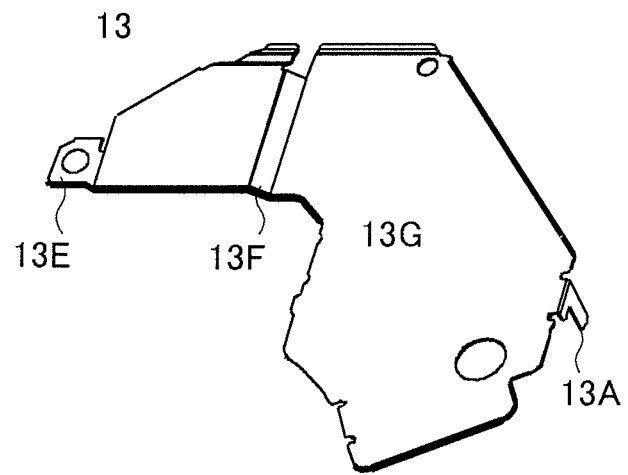
FIG. 2A is a view showing a cover provided to the optical pickup device of the present invention.
Figure 2B:
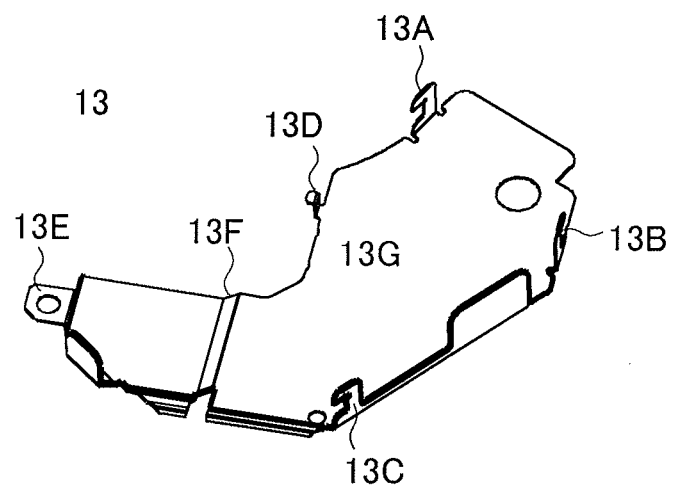
FIG. 2B is a perspective view showing the cover reversed front to back.

With reference to FIG. 2, a description is given of the shape of the cover covering the upper surface of the housing. FIG. 2A is a perspective view showing the upper surface of the cover 13, and FIG. 2B is a perspective view showing of the cover 13 turned upside down.

The cover 13 includes: a cover portion 13G covering the upper surface of the housing; a step portion 13F which is a part of the cover portion 13G folded in a step shape; a hole portion 13E provided at an end of the cover 13; and engagement portions 13A to 13D provided at the peripheral edge of the cover portion 13G. Furthermore, an end of the inside of the step portion of the cover 13 is firmly fixed to the housing 28 or actuator AT with an adhesive AD such as epoxy resin.

With reference to FIG. 2B, each of the engagement portions 13A to 13C is continuous to the cover portion 13G and is bent at 90 degrees to have an L shape. These engagement portions 13A to 13C are externally engaged with portions partially protruded from the side surface of the housing. The engagement portions 13A and 13B are provided near an end of the cover 13 in the longitudinal direction. The engagement portion 13C is provided near the middle part of the cover 13. Herein, the cover 13 includes the three engagement portions 13A to 13C, but the number of engagement portions may be not more than three or not less than four.

The hole portion 13E is provided at an end of the cover 13 to be fixed to the upper surface of the housing with a screw mechanism. The cover 13 includes the hole portion 13E only at one end but may include the hole portions 13E at both ends in the longitudinal direction.

The engagement portion 13D is continuous to the peripheral edge of the cover portion 13G and bent at 90 degrees and is provided near the center of the cover 13 in the longitudinal direction. The other engagement portion 13A and the like are engaged with the side surface of the housing while the engagement portion 13D is engaged with the opening portion provided in the upper surface of the housing.

The engagement portion 13D has a different profile from the engagement portion 13A and the like. Specifically, each of the engagement portion 13A and the like has an L shape protruding along the external profile of the cover 13 in order to be engaged with the protrusion formed by partially protruding the side surface of the housing. On the other hand, the engagement portion 13D has an L-shape protruding to the outside of the cover 13. The engagement portion 13D has such a shape in order to prevent the cover portion 13G from bulging. Furthermore, such a shape of the engagement portion 13D facilitates fitting the cover 13 into the housing.

Herein, with reference to FIG. 2A, in this embodiment, the hole portion 13E for screwing is provided bear an end of the cover 13 in the longitudinal direction thereof, and the engagement portion 13A is arranged near the other end. With such a configuration, the relative position of the cover 13 to the housing is determined by screwing the hole portion 13E. Moreover, since the engagement portion 13A is provided at the other end of the cover 13, variations in actual shape of the housing can be addressed by elastic deformation of the engagement portion 13A.

Figure 3:
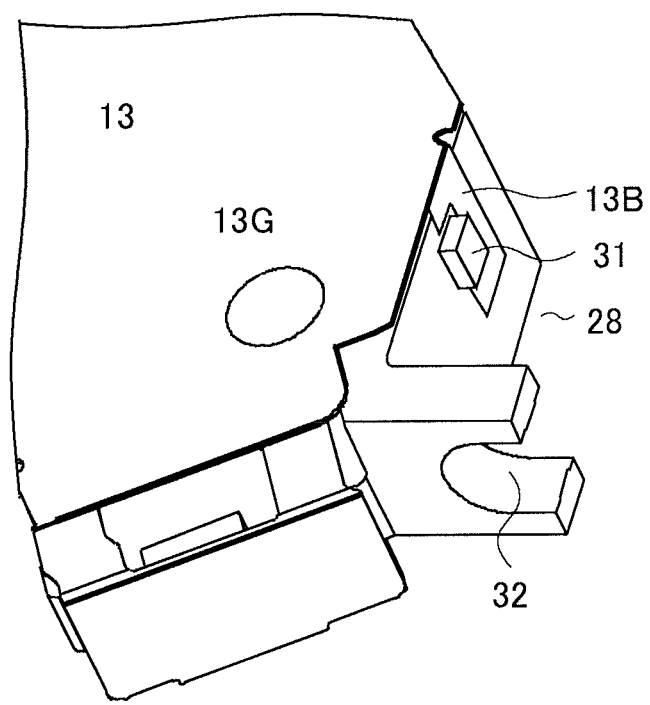
FIG. 3 is a view showing the optical pickup device of the present invention, being a perspective view showing a structure in which an engagement portion of the cover is engaged with a protrusion of the housing.

With reference to FIG. 3, a description is given of a structure in which the engagement portion 13B of the cover 13 is engaged with the housing 28. Herein, the configuration of engagement of the engagement portion 13 is described, but the same goes for the configuration of engagement of the engagement portion 13A an 13C shown in FIG. 2B.

As described above, the engagement portion 13B is provided so as to continuous to the peripheral edge of the cover portion 13G of the cover 13 and bent at 90 degrees. On the other hand, a part of the outside of the sidewall of the housing 28 corresponding to the engagement portion 13B is protruded to provide a protrusion 31. The cover 13 is incorporated in the housing 28 so that the inside of the engagement portion 13B is engaged at the side and downside of the protrusion 31.

In such a manner, the substantially L-shaped engagement portion 13B is engaged with the protrusion of the housing 28 to fix the cover 13 to the housing 28 in the thickness direction and in-plane direction of the housing 28.

Figure 4:
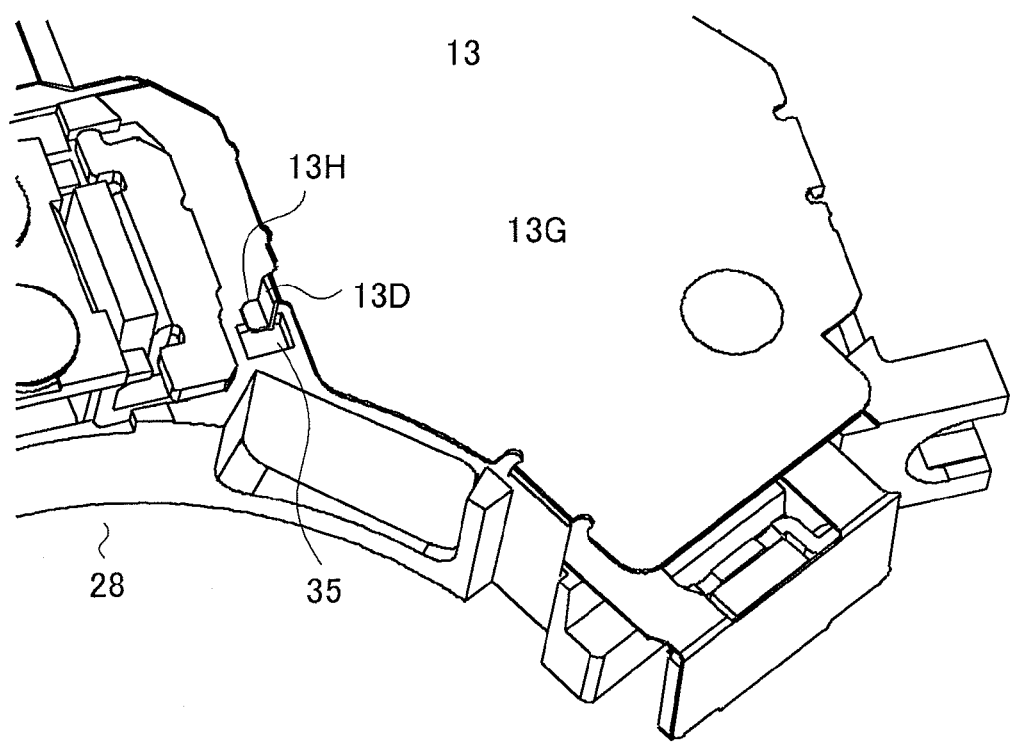
FIG. 4 is a view showing a the optical pickup device of the present invention, being a perspective view showing a structure in which another engagement portion of the cover is engaged with an opening of the housing.

Next, a description is given of the engagement portion 13D provided near the center of the cover 13 with reference to FIG. 4. First, the housing 28 is partially opened in the center of the upper surface to provide an opening portion 35. The engagement portion 13D of the cover 13 is inserted into the opening 35 to be engaged with the same. A top part 13H of the engagement portion 13D is bent outward so as to have a shape in parallel to the cover portion 13G. Accordingly, when the engagement portion 13D is inserted into the opening 35, the top part 13H of the engagement portion 13D comes into contact with the inner wall of the housing 28 from the inside.

Such a configuration prevents the phenomenon that the cover 13 bulges outward near the central part thereof. Specifically, if the actual dimensions of the housing 28 are different from the design values, stress acts so as to bulge the central part of the cover 13 when the cover 13 is firmly fixed to the housing 28. The housing 28 is manufactured by injection molding as described above, in particular, the actual dimensions of the housing 28 can be greatly different from the design values in some cases. Moreover, the stress to bulge the central part of the cover 13 outward can be caused in some cases if the cover 13 and housing 28 expand by different amounts due to variation in temperature in use.

In this embodiment, the top part 13H of the engagement portion 13D provided near the central part of the cover 13 is engaged with the opening portion 35 provided in the upper surface of the housing 28. Accordingly, even if the central part of the cover 13 tries to bulge outward, the engagement portion 13D engaged with the inner wall of the opening 35 serves as a hook to prevent the cover 13 from bulging. Herein, the opening portion 35 is arranged near the central part of the upper surface of the housing 28.

Herein, the cover 13 includes only one engagement portion 13D near the central part thereof but may include plural engagement portions 13D having a similar configuration near the central part of thereof.

Figure 5A:
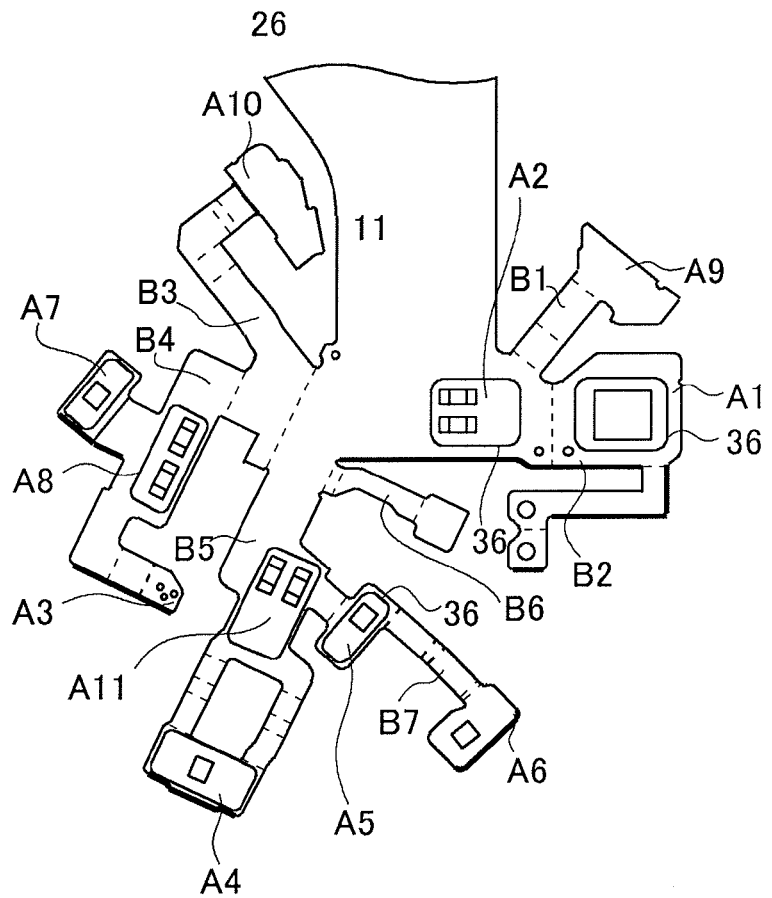
FIGS. 5A and 5B are views showing a flexible wiring board used in the optical pickup device of the present invention, FIG. 5A being a plan view showing an unfolded state of the flexible wiring board, FIG. 5B being a perspective view of the flexible substrate assembled in the housing.
Figure 5B:
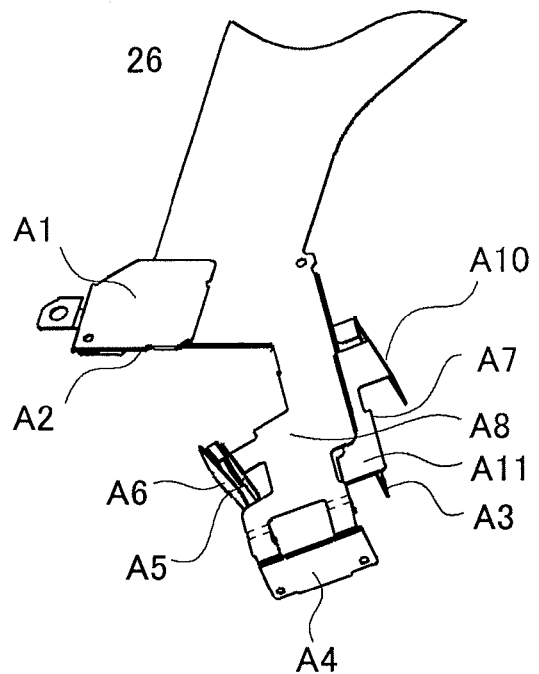

With reference to FIGS. 5A and 5B, a description is given of the entire configuration of the flexible wiring board 26 covered with the cover 13. FIG. 5A is an exploded plan view of the flexible wiring board 26. FIG. 5B is a perspective view showing the flexible wiring board 26 assembled in the optical pickup device. Herein, in FIG. 5A, the flexible wiring board 26 is shown with the surface where a single layer wiring pattern is exposed facing up. FIG. 5B shows the flexible wiring board 26 reversed front to back. In FIG. 5A, portions at which the flexible wiring board 26 is folded are indicated by dotted lines.

With reference to FIG. 5A, the flexible wiring board 26 is provided with a portion where each optical element constituting the optical pickup device 10 is mounted. To be specific, on the flexible wiring board 26, a control element mounting portion A1, a chip element mounting portion A2, a BD-LD mounting portion A3, a PDIC mounting portion A4, an FMD mounting portion A5, a package mounting portion A6, a package mounting portion A7, a chip element mounting portion A8, a connection terminal portion A9, a connection terminal portion A10, and a chip element mounting portion A11 are provided. These portions are continuous to each other through a wiring portion 11 of the flexible wiring board 26.

This wiring portion 11 is formed to be the widest and longest in the flexible wiring board 26. An end of the wiring portion 11, that is, the peripheral portion where the chip element mounting portion A2 is provided is a rectangular region of a certain size. In this rectangular region, two branch-shaped wiring portions B1 and B2 are provided on the right side. On the upper side of the rectangular region, the wiring portion 11 is integrally provided. On the left side, four branch-shaped wiring portions B3 to B6 are provided.

In wiring portions B1, B4, and B5, the chip element mounting portions A2, A8, and A11 are respectively provided, and a chip-type resistance, capacitor, or coil is mounted by solder connection.

A wiring portion B7 branched from the wiring portion B5 includes a package mounting portion A6. A package to be fixed to the package mounting portion A6 includes a volume resistor determining the FMD sensitivity of FMD. The wiring portion B4 includes the package mounting portion A7. In the package mounting portion A7, a package including a superposition IC for adding superimposed frequency to current to be supplied to the BD-LD is mounted.

Wiring portions B1 and B3 include the connection terminal portions A9 and A10, respectively. Each of the connection terminal portions A9 and A10 includes a pad composed of a wiring pattern and is a portion for electrical connection with a motor incorporated in the housing and the like.

Furthermore, a wiring portion B2 includes a portion where control and chip elements are mounted, to which a reinforcement plate 36 is bonded. This reinforcement plate 36 is made of a resin material having a mechanical strength higher than the base material of the flexible wiring board 26 (epoxy resin containing filler fibers, for example). Furthermore, the reinforcement plate 36 is bonded to the principal surface of the base material provided with no wiring pattern. Herein, the reinforcement plate 36 is indicated by a hatched region.

By reinforcing the flexible wiring board 26 with the reinforcement plate 36, chip parts and the like to be connected with solder can be stably fixed firmly. Furthermore, the reinforcement plate 36 can reduce deformation and deflection of the flexible wiring board 26, thus allowing the flexible wiring board 26 to be accurately fixed to the housing.

With reference to FIG. 5B, the flexible wiring board 26 having the aforementioned configuration is subjected to bending plural times and then incorporated in the optical pickup device. Herein, the control element mounting portion A1 overlaps the chip element mounting portion A2, which is described later with reference to FIGS. 7A to 7D. The BD-LD mounting portion A3, chip element mounting portion A11, chip element mounting portion A8, and package mounting portion A7 are folded, which is described later in detail with reference to FIGS. 6 to 7D. The FMD mounting portion A5 is bent so that the FMD faces inward. The package mounting portion A6 which is provided ahead of the FMD mounting portion A5 is bent to face inward. Furthermore, the connection terminal portion A10 is bent so that the wiring pattern faces inward.

Figure 6:
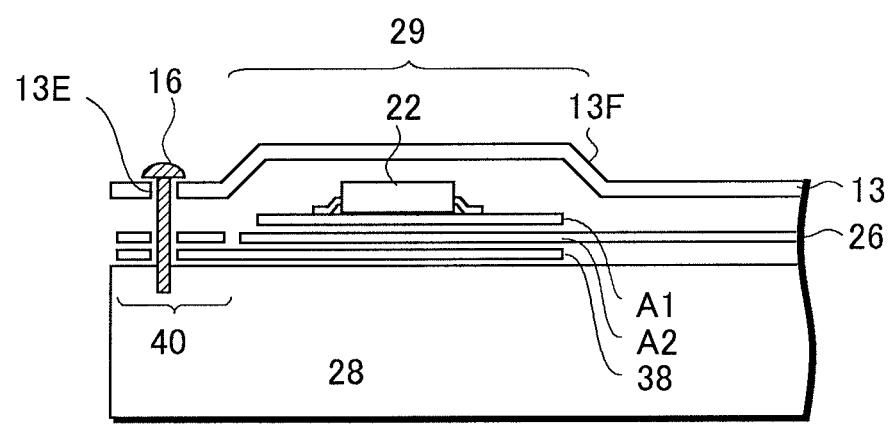
FIG. 6 is a cross-sectional view showing a structure in which the cover covers a portion where a package is placed in the optical pickup device of the present invention.

With reference to FIG. 6, in this embodiment, as described above, the folded flexible wiring board 26 is placed on the upper surface of the housing 28 and is covered with the cover 13.

Herein, the flexible wiring board 26 is subjected to bending, and the fixing portion 38, chip element mounting portion A2, and control element mounting portion A2 are overlapped on each other in three layers. This layer structure is described later with reference to FIGS. 7A to 7D.

Moreover, on the upper surface of the control element mounting portion A1, a package 22 is mounted. The package 22 includes a resin-sealed control element controlling the laser device. A part of the cover 13 covering the package 22 forms a protruded region 29 by the step portion 13F. This ensures space to place the package 22 between the cover 13 and the upper surface of the housing 28.

An insertion portion 40 continuous to the fixing portion 38 of the flexible wiring board 26 and the hole portion 13E of the cover 13 are fixed to the housing 28 using a same screw 16. The housing 28, flexible wiring board 26, and cover 13 are thus fixed to each other.

With reference to FIGS. 7A to 7D, a description is given of the method of stacking the control element mounting portion A1, chip element mounting portion A2, and fixing portion 38 of the flexible wiring board 26 shown in FIG. 6.

With reference to FIGS. 7A to 7D, first, a package including a control element (LDD) controlling current to be supplied to the LD for DVDs and CDs is fixed to the lower surface of the control element mounting portion A1. On the lower surface of the chip element mounting portion A2, a chip part as a noise countermeasure part for the LDD is firmly fixed. Moreover, the schematically L-shaped fixing portion 38 is extended from the control element mounting portion A1. At the top of the fixing portion 38, the insertion portion 40 for fixation is provided. The insertion portion 40 is provided with an opening allowing for screwing.

In this state, the control element mounting portion A1 is folded by 180 degrees at the boundary specified between the control element mounting portion A1 and the chip element mounting portion A2 to be laid over the chip element mounting portion A2.

Figure 7A:
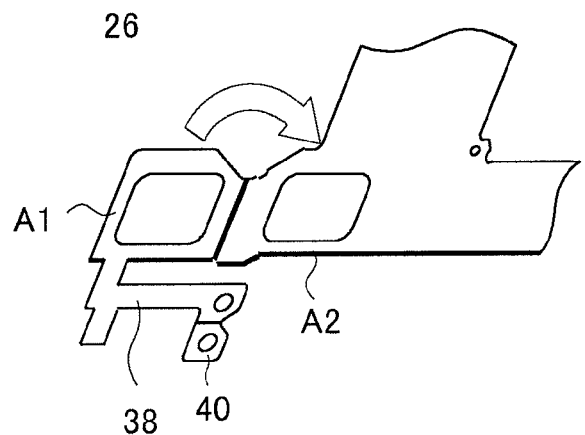
FIGS. 7A to 7D are perspective views showing a structure in which the flexible wiring board used in the optical pickup device of the present invention is folded.
Figure 7B:
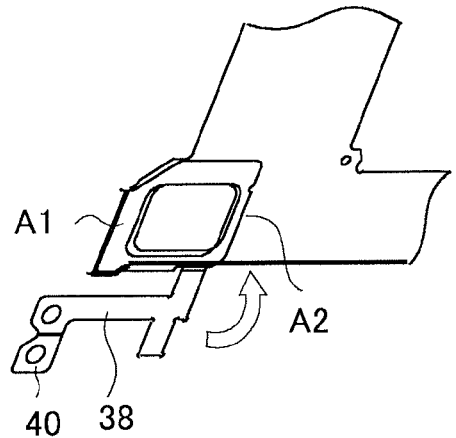
Figure 7C:
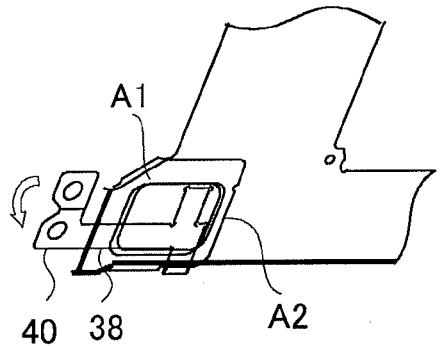
Figure 7D:
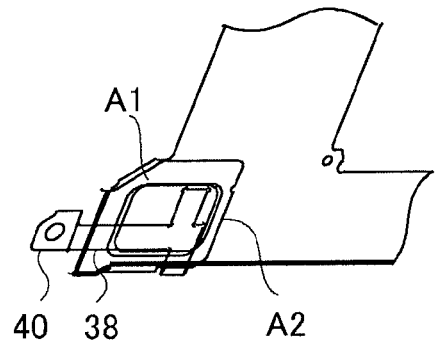

With reference to FIG. 7B, next, the fixing portion 38 is folded by 180 degrees at the boundary between the fixing portion 38 and the control element mounting portion A1 to be laid over the control element mounting portion A1.

Furthermore, with reference to FIGS. 4C and 4D, the insertion portion 40 is folded at the central part by 180 degrees. The holes provided on both sides of the insertion portion 40 are overlapped on each other to ensure the strength of the insertion portion 40. The flexible wiring board 26 is firmly fixed to the housing by a fastening means such as a screw inserted into the insertion portion 40 (refer to FIG. 6).

Figure 8:
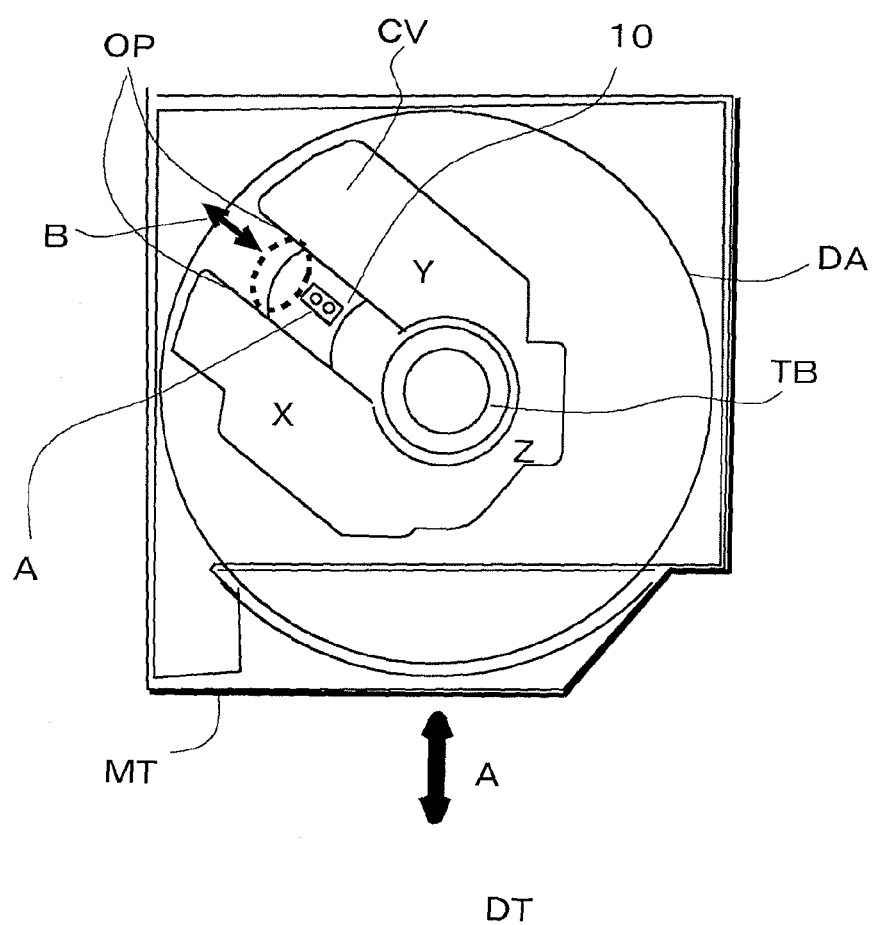
FIG. 8 is a view showing an optical disc device including the optical pickup device of the present invention.

Furthermore, the shapes of the housing and cover are described using FIGS. 8 to 11. FIG. 8 shows a part of a portable PC or a station-type PC including the optical pickup device 10 of FIGS. 1A and 1B. When a part of the PC is pushed lightly, a table DT for optical discs shown in FIG. 8 appears.

This table DT includes a metallic box (MT) in the outside, and the box is not thicker than about 1 cm. The part indicated by a circle in the drawing corresponds to a disk area (DA), and at the center thereof, a turntable (TB) to which the disk is fixed is provided. Most part of the disk area is made of resin, and to the back of the disk area, the printed board and the like are attached. Moreover, a cover (CV) made of metal is partially provided. This cover (CV) has a U-shape. To be specific, the cover (CV) has a U shape composed of a protrusion X on the lower side, a protrusion Y on the upper side, and a bottom Z. The part between the two protrusions is an open part (OP) not provided with the cover.

This open part OP is elongated in the radial direction and is wide enough to allow at least the objective lens 33 to be exposed. The optical pickup device 10 is provided in this open part OP. The open part OP is an area where the optical pickup device 10 moves in the radial direction and is opened because requiring light to travel in and out. The cover (CV) may be made of a material same as the resin cover provided to the disk area (DA).

Back in FIGS. 1A and 1B, if the optical pickup device 10 is moved with the guide shafts inserted into the guide hole 30 and guide recess 32, the optical pickup device 10 moves in the direction indicated by an arrow B in FIG. 8. The open part of the cover (CV) is wide enough to allow the objective lens 33 and an objective lens holder to be exposed, and the other part is covered with this cover (CV) and the resin cover of the disk area.

In FIG. 1B, the control IC 22 is arranged above the actuator provided with the objective lens 33 in terms of the page. In this portion, the flexible sheet is folded, and the electronic parts such as the IC are arranged. Accordingly, this portion is lifted up from the other area. This portion, which is surrounded by a dotted line in FIG. 8, corresponds to the open part with the cover removed and can be made thicker than the other area. If the IC 22 is mounted on the other area, the thickness of the optical pickup device 10 is increased in the covered portion. Accordingly, the flexible sheet and IC 22 are provided in the portion indicated by the dotted line. The surface of the cover (CV) is slightly lifted up in the thickness direction in the middle thereof. Since the components which will increase the thickness of the optical pickup device 10 are provided in this open area, such a configuration has an advantage of making the optical pickup device 10 thinner. Certainly, the components are provided in the open area to the extent that the cover 13 does not come into contact with the optical disc. In other words, as described above, the cover 13 is provided so as to protrude to the same height as the top of the objective lens 33.

In FIG. 1B, the flexible sheet is folded to form plural layers in this portion. The flexible sheet is folded more times than the other area. Moreover, the flexible sheet is folded so that the conductive pattern for the IC 22 faces up. This conductive pattern is provided with parts including chip elements, ICs, variable resistors, and variable capacitors and is therefore thicker than the other part. In FIG. 1A, accordingly, the cover 13 is lifted up and formed in a raised shape. When the flexible sheet includes a conductive pattern of one layer on one side, for example, the conductive pattern can be arranged in the front surface according to a proper folding way, and it is not necessary to prepare a multilayer sheet with conductive patterns formed on both surfaces.

Figure 10:
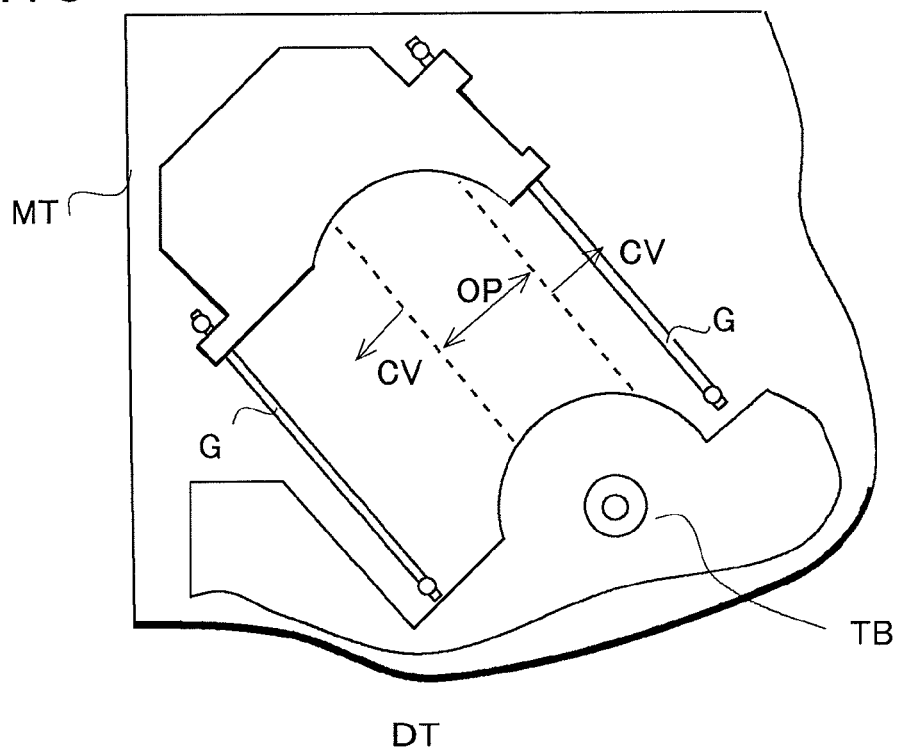
FIG. 10 is a view showing a part of the optical disc device including the optical pickup device of the present invention.

With reference to FIGS. 9 and 10, a description is given of the shape and arrangement of the optical pickup device 10.

Basically, the optical pickup device 10 may have any planer exterior profile including rectangular and circular profiles. For example, the optical pickup device 10 may have a rectangular exterior profile as indicated by a dotted line of FIG. 9A. In this case, the optical pickup device 10 has corners S1 and S2 cut off so that the travel distance of the objective lens 33 is maximized when the optical pickup device 10 is moved in a diagonal direction of the rectangular metallic box (MT), or in the direction indicated by an arrow B. Furthermore, a lateral side L1, which is opposite to a lateral side having the corner S1, is partially curved to fit onto the turntable TB. The shape of FIG. 9B is thus completed. This is a rectangular shape in which the two corners are removed and the long side L1 with corners not removed is cut off with a curvature radius of the turntable.

On the other hand, to move the optical pickup device 10 in a non-diagonal line area of the metal box, the optical pickup device 10 may have a rectangular exterior profile provided with a same curvature radius as the turntable on the long lateral side L1.

Figure 11:
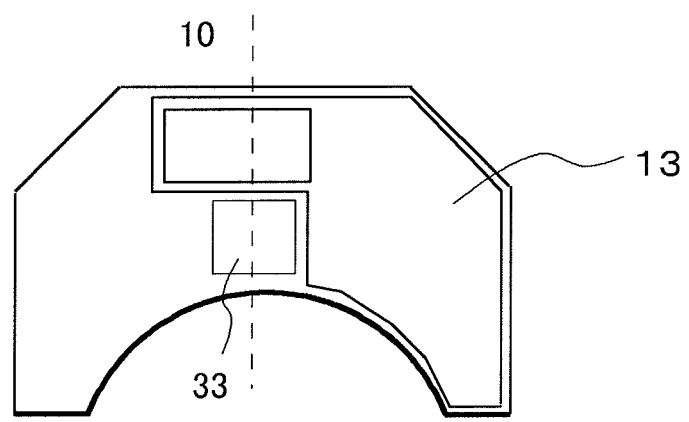
FIG. 11 is a view showing an exterior profile of the optical pickup device of the present invention.

Next, the cover 13 of FIG. 1 is schematically described in FIG. 11. The objective lens 33 or the objective lens holder is placed on the center line indicated by a dotted line in the curved side in the above-described planer shape. The cover 13 covers the right side of the center line except the holder. The cover 13 above the holder is lifted up.

The cover 13 allows the optical element to be positioned through the hole portion 15 and can protect the flexible sheet provided under the lifted-up portion and electronic parts mounted thereon thanks to the lift-up of the cover 13. Moreover, it is possible to prevent short circuit and the like.

The invention claimed is:

1. An optical pickup device, comprising:
a housing including a principal plane, a curved first side surface and a second side surface facing the first side surface, the housing containing an actuator supporting an objective lens;
an optical element accommodated in the housing; and
a covering member comprising a covering portion covering an area of the principal plane of the housing so as to expose the actuator,
wherein the covering member is made of a metal, comprises a first engagement portion contiguous with the covering portion and engaging with a protrusion portion provided on the second side surface of the housing and a second engagement portion contiguous with the covering portion and inserted into an opening portion opened in the housing at the principal plane,
the opening portion is disposed between the actuator and the covering portion, and
a flexible wiring board electrically connected to the optical element is placed on the principal plane of the housing, and the flexible wiring board is folded and covered with the covering member.

2. The optical pickup device according to claim 1, wherein the covering member comprises a hole portion so that the covering member is fixed to the housing with a screw penetrating the hole portion, an insertion portion provided in the flexible wiring board and a hole portion of the covering member are fixed to the housing with the same screw.

3. The optical pickup device according to claim 1, wherein a control element controlling the optical element is placed on the principal surface of the housing, and a part of the covering member covering the control element is folded in a step shape projecting outward.

4. The optical pickup device according to claim 3, wherein an inner end portion of the part of the covering member folded in a step shape is fixed to the housing with an adhesive.

5. The optical pickup device according to claim 1, wherein the second engagement portion comprises an elastic portion contiguous with a peripheral part of the covering portion and folded to extend in a direction perpendicular to the primary plane and a tip portion contiguous with the elastic portion and extending in a direction parallel to the primary plane, and the tip portion is in contact with an inner surface of the housing.

6. The optical pickup device according to claim 5, wherein the tip portion extends outward.

7. The optical pickup device according to claim 1, wherein the second engagement portion is formed by pressing.

8. The optical pickup device according to claim 1, wherein the second engagement portion takes an L shape extending outward.

9. The optical pickup device according to claim 1, wherein the covering portion takes an L shape in plan view of the optical pickup device.

10. The optical pickup device according to claim 1, wherein the housing is made of a metal or a resin formed by injection molding.

* * * * *